(No Model.)

J. H. SWIHART.
COMPUTING SCALE.

No. 597,922. Patented Jan. 25, 1898.

Witnesses.
E. B. Gilchrist
N. M. Hutchison

Inventor:
John Henry Swihart,
By his Attorneys,
Thurston & Bates

UNITED STATES PATENT OFFICE.

JOHN HENRY SWIHART, OF CLEVELAND, OHIO, ASSIGNOR TO THE NATIONAL COMPUTING SCALE COMPANY, OF SAME PLACE.

COMPUTING-SCALE.

SPECIFICATION forming part of Letters Patent No. 597,922, dated January 25, 1898.

Application filed May 12, 1897. Serial No. 636,158. (No model.)

*To all whom it may concern:*

Be it known that I, JOHN HENRY SWIHART, a citizen of the United States, residing at Cleveland, in the county of Cuyahoga and State of Ohio, have invented certain new and useful Improvements in Computing-Scales; and I do hereby declare the following to be a full, clear, and exact description of the invention, such as will enable others skilled in the art to which it appertains to make and use the same.

My invention relates to a computing-scale employing a rate-beam whose leverage is changed for various rates. In some scales of this character the leverage of the rate-beam is varied by changing the fulcrum-point, in others by changing the point to which the load is applied. In either case the accuracy of the scale is dependent upon the precision with which this relatively-movable bearing (whether it be the beam-fulcrum or the device through which the load is suspended from the beam) is brought into engagement with the beam.

The object of my invention is to provide simple and effective means whereby all changes in the leverage of the rate-beam shall be effected with absolute accuracy.

To this end it consists, broadly, in the combination of the rate-beam having a plurality of properly-spaced knife-edge bearings upon one edge with a relatively-movable bearing-piece adapted to be brought into engagement with any of these knife-edge bearings to change the leverage of the scale.

It also consists in the more specific combinations and subcombinations of parts described, and pointed out definitely in the claims.

Figure 1:
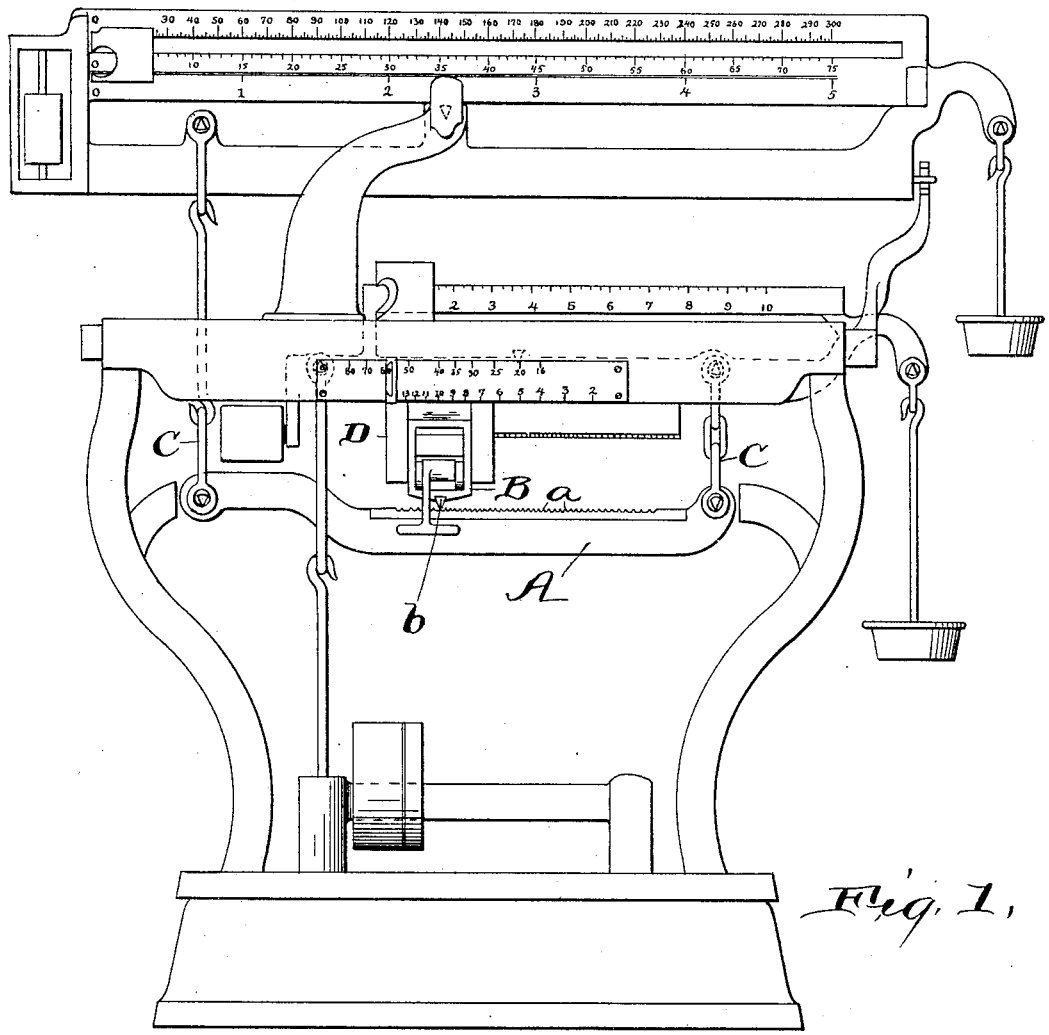
Figure 2:
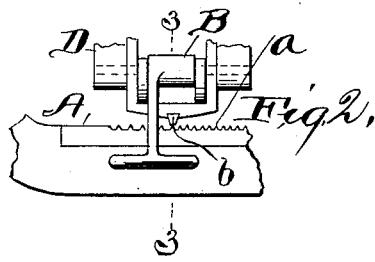
Figure 3:

In the drawings, Figure 1 is a front elevation of a computing-scale embodying my invention. Fig. 2 is an enlarged view of the fulcrum-block and its coöperating parts, and Fig. 3 is a vertical section on the line 3 3 of Fig. 2.

To illustrate the invention, I have shown a computing-scale substantially like that which is described in Letters Patent No. 578,784, granted to me March 16, 1897, which scale has a movable fulcrum and a beam which is not movable longitudinally; but I do not intend to limit the broad invention to this particular scale or to a scale having this construction.

Referring by letters to the parts as shown, A represents the rate-beam, which is suspended from two freely-swinging links C, and B the movable fulcrum-block for the rate-beam. On the upper edge of the rate-beam are formed a plurality of transverse knife-edge bearings $a$, which are properly spaced. The part $b$ of the fulcrum-block, which engages with these knife-edge bearings, may be flat or it may be transversely grooved, and it is of such width that when engaging with one knife-edge it will not strike one of the adjacent knife-edges and thereby interfere with the action of the beam.

The fulcrum-block is vertically movable in a carriage D, and the carriage is supported by the frame of the scale and may be moved lengthwise of the beam. Therefore by raising the fulcrum-block out of contact with the beam the carriage may be moved to bring the fulcrum-block over any desired knife-edge $a$, with which it will engage when again moved down.

Heretofore in computing-scales the rate-beam has been notched and the changeable bearing has carried a knife-edge for engagement in said notches. In a scale having this construction of the parts named the movable bearing must be accurately positioned relative to the beam before it is moved into engagement with said beam; otherwise the knife-edge may engage with some unnotched part of the beam or may engage with the inclined wall of the notches in the beam. In either case the result will be an improper division of the leverage of the beam and the inaccurate operation of the scale; but with the construction shown and described if any part of the fulcrum is brought into contact with the proper knife-edge the scale will work accurately, because the knife-edge is the desired fulcrum-line. It is only when the fulcrum is so far away from the proper position that it will not strike the proper knife-edge at all that the scale will not perform its functions with accuracy.

Having described my invention, I claim—

1. In a computing-scale, the combination of a rate-beam having on one edge a plurality of transverse vertical knife-edge bearings which are properly spaced, with a relatively-movable bearing adapted to be brought into contact with any of the said knife-edges to change the leverage of the beam, substantially as and for the purpose specified.

2. In a computing-scale, the combination of a relatively-adjustable fulcrum and rate-beam, the latter having on one edge for engagement with the fulcrum a plurality of properly-spaced knife-edge bearings, substantially as specified.

3. In a computing-scale, the combination of a rate-beam and a fulcrum, which are relatively movable, first, toward and from each other to cause their engagement and disengagement and, second, lengthwise of the beam to determine the engaging-point, the rate-beam having for engagement with the fulcrum a plurality of properly-spaced knife-edge bearings, substantially as specified.

4. In a computing-scale, the combination of a rate-beam having on one edge a plurality of properly-spaced vertical knife-edge bearings, with a fulcrum movable longitudinally of the rate-beam to any desired position relative to said beam, and into and out of engagement with the said knife-edge bearings, substantially as described.

In testimony whereof I affix my signature in presence of two witnesses.

JOHN HENRY SWIHART.

Witnesses:
   E. L. THURSTON,
   ALBERT H. BATES.